July 22, 1947.  R. L. JONES  2,424,317

DYNAMOELECTRIC MACHINE

Filed July 20, 1945  2 Sheets—Sheet 1

WITNESSES:

INVENTOR
Robert L. Jones.
BY
ATTORNEY

July 22, 1947.   R. L. JONES   2,424,317
DYNAMOELECTRIC MACHINE
Filed July 20, 1945   2 Sheets-Sheet 2
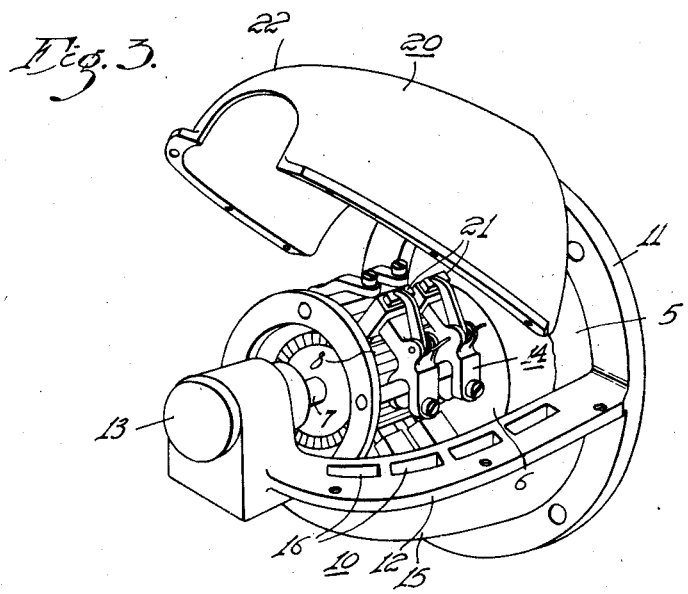
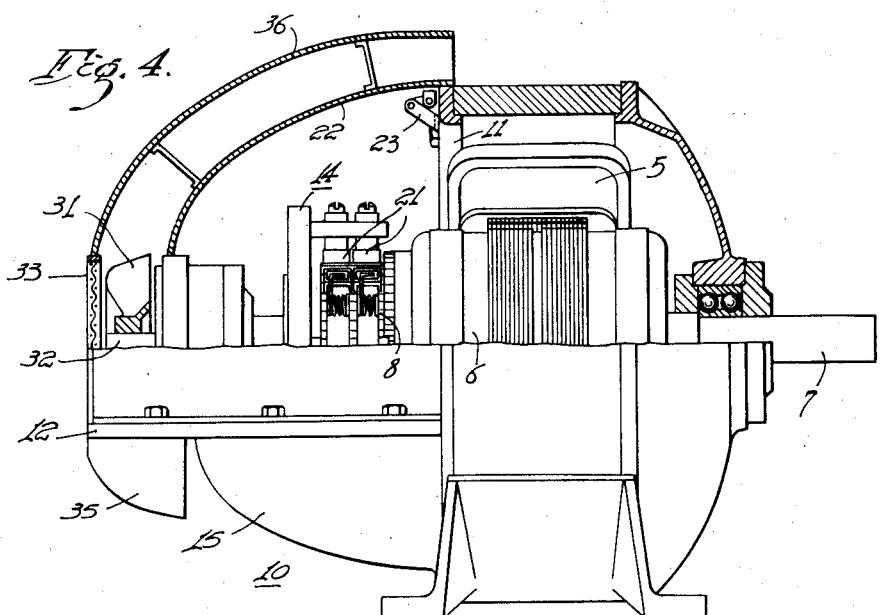
WITNESSES:
INVENTOR
Robert L. Jones.
BY
ATTORNEY Patented July 22, 1947

2,424,317

UNITED STATES PATENT OFFICE 2,424,317

DYNAMOELECTRIC MACHINE

Robert L. Jones, Swissvale, Pa., assignor to Westinghouse Electric Corporation, East Pittsburgh, Pa., a corporation of Pennsylvania Application July 20, 1945, Serial No. 606,095

6 Claims. (Cl. 171—252)

My invention relates to dynamo-electric machines, and particularly to the front end-bracket assembly of horizontal-shaft motors and generators.

An object of my invention is to provide a novel folding-hood type of front end-bracket assembly, providing quick and complete access to the brush-rig assembly.

As applied to an open machine, or a partially open machine, my invention provides a novel drip-proof ventilating-arrangement, with the ventilating-holes disposed in the hood-seat of my front end-bracket assembly. My invention is also applicable, with a sight modification, to a fan-cooled machine in which the motor or generator is totally enclosed, with a double-walled front-bracket construction, and a fan flowing cooling air between the two walls of the bracket.

With the foregoing and other objects in view, my invention consists in the structures, combinations, parts, methods, and assemblies hereinafter described and claimed, and illustrated in the accompanying drawings, wherein:

Fig. 3 is a perspective view of the bracket-assembly in its open position; and

Fig. 4 is a longitudinal sectional view of a fan-cooled machine embodying my invention.

Figure 1:
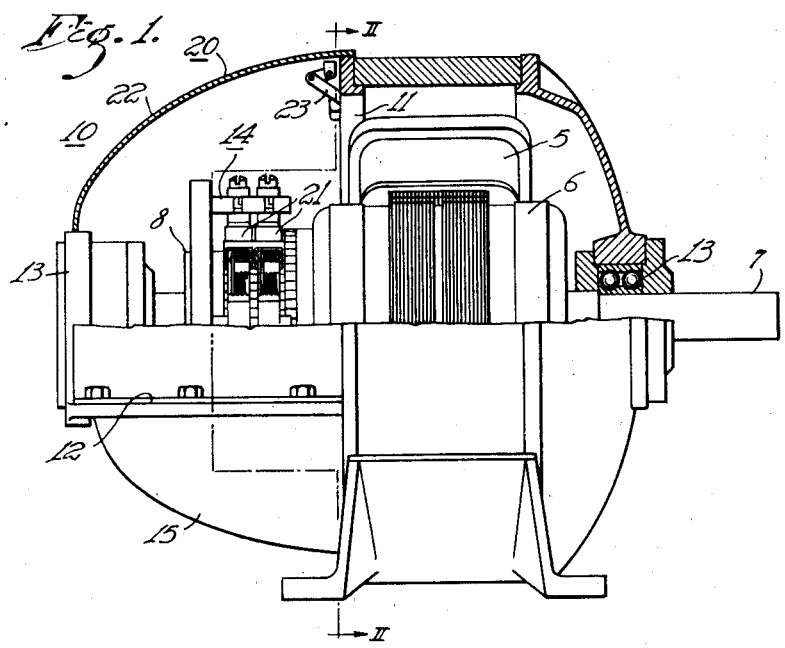
Figure 1 is a longitudinal sectional view of a drip-proof direct-current dynamo-electric machine embodying my invention.
Figure 2:
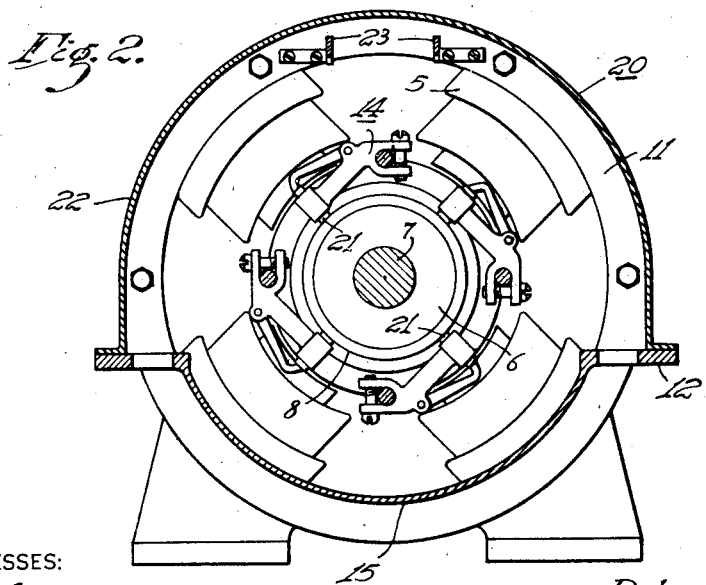
Fig. 2 is an end view of the front end-bracket assembly thereof, with parts in section on the line II—II of Fig. 1.

In Figures 1, 2 and 3, my invention is applied to a general-purpose horizontal-shaft dynamo-electric machine, which may be either a motor or a generator, embodying my invention in a drip-proof construction. The machine may be either a shunt or compound direct-current machine, or it may be a wound-rotor induction motor, or it may be any other type of machine having need for ready access to one or both ends thereof.

In the particular design which I have chosen for illustration in Figs. 1, 2 and 3, the machine is a direct-current machine, having a stator member 5, a rotor member 6, a horizontal shaft 7 on which the rotor member is mounted, and a current-collecting device, in this case a commutator 8, carried by the shaft at the front end of the rotor member. A front end-bracket assembly 10 is secured to the front end of the stator member 5, having a rear ring-shaped attachment-portion 11 for this purpose. Extending forwardly from the ring-shaped attachment portion 11, is a rigid hood-seat 12 which encircles the front end of the machine, preferably in a plane below the plane of the shaft 5. The front end of the hood-seat 12 carries a front shaft-supporting bearing 13, behind which a brush-rig assembly 14 is supported by the hood-seat 12. The lower portion of the front end-bracket assembly is usually closed by a lower front-end cover-portion 15, which, in a drip-proof machine as illustrated, is attached to the inner edge of the hood-seat 12, so that the hood-seat acts as a sort of horizontal flange-portion surrounding the top of the lower cover-portion 15. Drip-proof ventilation is provided by a series of vertically extending ventilating-openings 16 in the hood-seat 12.

My invention also includes a hood-assembly 20, which is hingedly carried by the front end-bracket assembly 10 in a position to extend, as a hood, over the brush-rig assembly 14, and adapted to be seated, in its closed position, on the outer rim of the hood-seat 12. Any suitable hinged supports may be provided, whereby the hood-assembly 20 is openable up away from the hood-seat 12 to afford wide access to the brush-rig assembly 14, so that the brushes 21 may be easily reached for servicing. In the preferred form of construction, which is illustrated in Figs. 1, 2 and 3, a one-piece hood 22 is shown, which is hinged in a manner similar to a one-piece automobile-hood, as by means of hinges 23 carried by the top portion of the ring-shaped attachment-portion 11 of the front end-bracket assembly 10. While the one-piece hinged-hood construction is preferred, as providing the maximum access to the brush-rig assembly, my invention contemplates that other hood-mountings may be utilized, within the spirit of the invention.

My invention is particularly applicable to a dynamo-electric machine in which the brush-rig assembly 14 comprises a plurality of brushes 21 which bear on the current-collecting device 8 at more than two points about its circumference, the two lowermost brushes 21 being both spaced from the lowest point of the circumference of the current-collecting device 8. The plane of the hood-seat 12 is preferably sufficiently low to provide reasonable access to these two lowermost brushes 21 from the top, when the hood 22 is raised. As the serviceman can readily reach down a little way within the hood-seat 12, inside the lower cover-portion 15, to get at the two lowermost brushes 21, it is usually desirable to make the plane of the hood-seat 12 somewhere intermediate between the horizontal plane of the two lowermost brushes 21 and the plane of the centerline of the shaft 7. Of course, all of the other brushes 21 are immediately and openly accessible, as soon as the hood 22 is raised, as shown in Fig. 3.

When ventilating openings are to be provided at the front end of the machine, this is readily accomplished, according to my invention, in a manner which automatically provides a drip-proof construction, that is, in a manner which automatically protects the machine against the entrance of dripping water or other liquids. In such a case, I prefer to provide the front-end ventilating-openings in the form of the vertically extending ventilating-openings 16, extending through the hood-seat 12. The reason will now be evident, why the lower cover-portion 15 depends from the inner edge of the hood-seat 12, while the hood 22 seats on the top outer edge of the hood-seat 12, because the ventilating air can thus enter the machine by passing upwardly through the ventilating openings 16 in the hood-seat 12, thus entering the space underneath the hood 22 at the front end of the machine. The hood thus automatically provides a drip-proof cover, without requiring the loose covers which are characteristic of many commonly used drip-proof constructions which have heretofore been prevalent.

In the operation of the machine as shown in Figs. 1, 2 and 3, it will thus be apparent that my novel front end-bracket assembly 10, with its hinged hood-assembly 20, provides quick and complete access to the brushes 21, while at the same time providing a simple and effective drip-proof construction requiring no loose drip-proof covers or special constructions, and at the same time giving the machine an extremely pleasing, modern, stream-lined appearance.

My invention is also applicable to totally enclose, or so-called fan-cooled machines, as shown in Fig. 4. In this case, the machine itself is totally enclosed, the ventilating-openings 16 being omitted; and external cooling is provided by a fan 31 which is carried by a shaft-end 32 of the shaft 7, which extends through the front bearing 13. The fan 31 is enclosed in a suitable guard 33 which is carried by the bearing-housing 13 or other parts of the stationary end-bracket assembly 10. The lower cover-portion 15 is supplemented by a spaced outer lower shroud 35; while the simple single-thickness hood 22 is supplemented by a spaced outer upper shroud 36. The shrouds 35 and 36 direct the air, from the fan 31, back over the lower cover-portion 15 and the hood 22, and thence on back over the stator member 5 of the machine, to cool the machine in a manner which is already known.

While I have illustrated my invention in only two forms of embodiment, both forms being applied to a direct-current type of machine, I desire it to be understood that my invention is susceptible of many other forms of embodiment, and is, in general, applicable to any dynamo-electric machine in which ready access is required, for one or both ends of the machine.

I claim as my invention:

1. A dynamo-electric machine having a stator member, a rotor member, a horizontal shaft on which the rotor member is mounted, a current-collecting device carried by the shaft at the front end of the rotor member, a front end-bracket assembly secured to the front end of the stator member and having a forwardly extending hood-seat encircling the front end of the machine in a plane below the plane of the shaft, a front shaft-supporting bearing carried by the front end of the hood-seat, a brush-rig assembly supported by the hood-seat, a lower front-end cover-portion carried by the hood-seat, and a hood-assembly hingedly carried by the front end-bracket assembly in a position to extend as a hood over the brush-rig assembly and to be seated, in its closed position, on the hood-seat, said hood-assembly being openable up away from the hood-seat to afford wide access to the brush-rig assembly 2. The invention as defined in claim 1, characterized by the brush-rig assembly comprising a plurality of brushes bearing on said current-collecting device at more than two points about its circumference, the two lowermost brushes being both spaced from the lowest point of the circumference of the current-collecting device, and the plane of the hood-seat being sufficiently low to provide reasonable access to said two lowermost brushes from the top when the hood-assembly is raised.

3. A dynamo-electric machine having a stator member, a rotor member, a horizontal shaft on which the rotor member is mounted, a current-collecting device carried by the shaft at the front end of the rotor member, a front end-bracket assembly secured to the front end of the stator member and having a forwardly extending hood-seat encircling the front end of the machine in a substantially horizontal plane, a front shaft-supporting bearing carried by the front end of the hood-seat, a brush-rig assembly supported by the hood-seat, a lower front-end cover-portion carried by the inner edge of the hood-seat, said hood-seat having one or more approximately vertically extending ventilating-openings therein, and a hood-assembly hingedly carried by the front end-bracket assembly in a position to extend as a hood over the brush-rig assembly and to be seated, in its closed position, on the outer edge of the hood-seat, said hood-assembly being openable up away from the hood-seat to afford wide access to the brush-rig assembly.

4. A fan-cooled dynamo-electric machine having a stator member, a rotor member, a horizontal shaft on which the rotor member is mounted, a current-collecting device carried by the shaft at the front end of the rotor member, a front end-bracket assembly secured to the front end of the stator member and having a forwardly extending hood-seat encircling the front end of the machine in a substantially horizontal plane, a front shaft-supporting bearing carried by the front end of the hood-seat, said shaft having a shaft-end extending through the front end of the bearing, a fan carried by said shaft-end, a fan-guard carried by the front end-bracket assembly, a brush-rig assembly carried by the front end-bracket assembly, a lower front-end cover-portion and a spaced outer lower shroud carried by the hood-seat, and a hood-assembly comprising a hood and a spaced outer upper shroud hingedly carried by the front end-bracket assembly in such a position that the hood extends over the brush-rig assembly and is adapted to be seated, in its closed position, on the hood-seat, said hood-assembly being openable up away from the hood-seat to afford wide access to the brush-rig assembly.

5. A dynamo-electric machine having a stator member, a rotor member, a horizontal shaft on which the rotor member is mounted, a front end-bracket assembly secured to the front end of the stator member and having a forwardly extending hood-seat encircling the front end of the machine in a plane below the plane of the shaft, a front shaft-supporting bearing carried by the front end of the hood-seat, a lower front-end cover-portion carried by the hood-seat, and a hood-assembly hingedly carried by the front end-bracket assembly in a position to extend as a hood over the front end of the machine and adapted to be seated, in its closed position, on the hood-seat, said hood-assembly being openable up away from the hood-seat to afford wide access to the front end of the machine.

6. A dynamo-electric machine having a stator member, a rotor member, a horizontal shaft on which the rotor member is mounted, a front end-bracket assembly secured to the front end of the stator member and having a forwardly extending hood-seat encircling the front end of the machine in a plane below the plane of the shaft, a front shaft-supporting bearing carried by the front end of the hood-seat, a lower front-end cover-portion carried by the inner edge of the hood-seat, said hood-seat having one or more approximately vertically extending ventilating-openings therein, and a hood-assembly hingedly carried by the front end-bracket assembly in a position to extend as a hood over the front end of the machine and adapted to be seated, in its closed position, on the outer edge of the hood-seat, said hood-assembly being openable up away from the hood-seat to afford wide access to the front end of the machine.

ROBERT L. JONES.

REFERENCES CITED

The following references are of record in the file of this patent:

UNITED STATES PATENTS

| Number | Name | Date |
| --- | --- | --- |
| 738,782 | Edwards | Sept. 15, 1903 |
| 1,009,951 | Armstrong | Nov. 28, 1911 |

FOREIGN PATENTS

| Number | Country | Date |
| --- | --- | --- |
| 496,467 | Great Britain | Nov. 30, 1938 |